J. H. HAMMOND, Jr.
SYSTEM FOR CONTROL OF BODIES BY RADIANT ENERGY.
APPLICATION FILED JULY 14, 1913. RENEWED MAY 2, 1922.

1,418,789.

Patented June 6, 1922.

Witnesses:
Carl L. Choate.
Franklin E. Low.

Inventor:
John Hays Hammond Jr.,

UNITED STATES PATENT OFFICE.

JOHN HAYS HAMMOND, JR., OF GLOUCESTER, MASSACHUSETTS.

SYSTEM FOR CONTROL OF BODIES BY RADIANT ENERGY.

1,418,789. Specification of Letters Patent. Patented June 6, 1922.

Application filed July 14, 1913, Serial No. 778,829. Renewed May 2, 1922. Serial No. 558,041.

*To all whom it may concern:*

Be it known that I, JOHN HAYS HAMMOND, Jr., a citizen of the United States, and a resident of Gloucester, in the county of Essex and State of Massachusetts, have invented an Improvement in Systems for Control of Bodies by Radiant Energy, of which the following description, in connection with the accompanying drawings, is a specification, like characters on the drawings representing like parts.

This invention relates to the control of moving bodies at a distance by radiant energy.

In order that the principle of the invention may be readily understood, I have disclosed a single embodiment thereof in the accompanying drawing, wherein—

Figure 1:
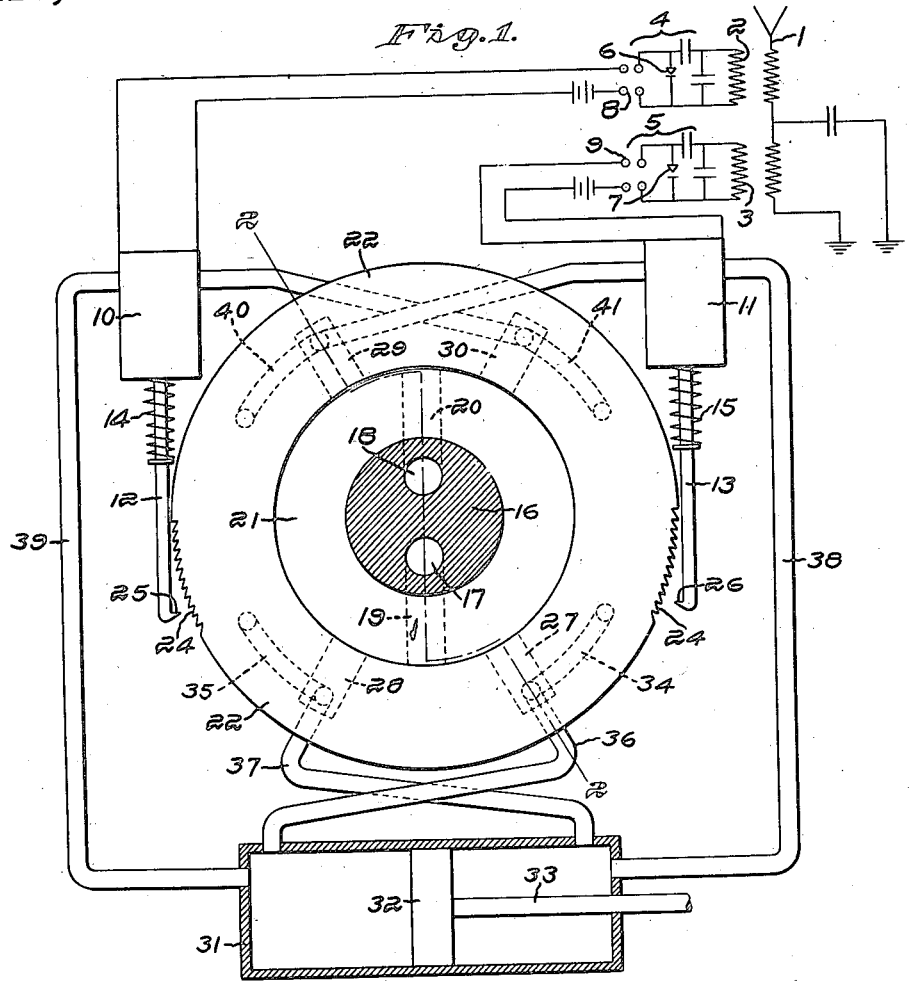
Fig. 1 is a view, mainly diagrammatic but partially in plan and partially in transverse section, of one form of apparatus for practicing my invention.

In order to control moving bodies at a distance by radiant energy, such for example as vessels, it has heretofore been necessary that the operator shall, at all times, be in touch with and directing the mechanism on board the vessel or other body which he is guiding. In practice and particularly in controlling the course of a torpedo or other moving vessel by radiant energy, I have found that prior to my present invention and that disclosed in my companion application Serial No. 778,828, there has been a constant need of sending signals, in order to rectify the course of such vessel, due to errors arising from wave, wind, current and other phenomena. One important object of my invention is to provide improved means for maintaining a definite, predetermined or fixed direction of movement of the propelled body, to which I shall herein refer for purposes of description as a vessel, and from which the direction or control of the vessel may be relieved by the distant operator by means of which I have disclosed one embodiment, and who may then, by proper wave emission from the control station, direct the course of the vessel. For the accomplishment of my purpose, I employ a suitable controller, preferably a gyroscope, which will keep the vessel on a fixed or predetermined course, except at such times as the operator shall change the course by proper wave emission from some control station. I thereby obviate the necessity of constant wave emission from the control station, and therefore greatly minimize the possibility of the enemy determining the wave length or wave characteristic used in the control of the torpedo or other vessel, and thereupon interfering with the control thereof. In accordance with my invention, I provide for the utilization of different radiant energy characteristics, herein disclosed as electromagnetic, for modifying or varying the control of the vessel or other body by the gyroscope or other controller. In the preferred embodiment of the invention described hereinafter, I have disclosed the employment of electromagnetic waves of different lengths.

Referring to the drawing, wherein I have shown a single embodiment of means for carrying out my invention, I have indicated at 1 an open, oscillatory circuit connected to the windings 2, 3 of two closed oscillatory circuits 4, 5, the former having therein a suitable detector of electrical oscillations 6 and the latter having therein a suitable detector of electric oscillations 7, the said detectors 6, 7 responding to different electrical frequencies or characteristics, the distant operator transmitting two wave lengths as circumstances may require, to which said detectors are respectively responsive. Within the scope of my invention, any contrasting wave characteristics may be employed, but preferably I employ contrasting wave lengths.

Although I have herein indicated the use merely of two different wave lengths, it is to be understood that in other forms of my invention I may utilize more than two different wave lengths or wave characteristics, if desired.

The circuit 4 is provided with a sensitive relay 8 or other contact-making device, and the circuit 5 is provided with a sensitive relay or other contact-making device 9.

The circuits 4 and 5 respectively have therein solenoids 10 and 11 controlling cores or plungers 12 and 13 preferably constituting in effect pawls and which are represented as provided with coil springs 14 and 15, by which they are projected into the position shown when neither closed oscillatory circuit is responding to electrical vibrations transmitted by the distant operator.

I preferably provide a controller which in the disclosed form of the invention is a gyroscope and provide suitable connections between said gyroscope and the rudder means or other suitable steering device for the vessel, and I also provide suitable means intermediate said rudder means or steering means and the cores or plungers 12 and 13, whereby when desired the distant operator may deviate the course of the vessel from the straight ahead, predetermined or definite course on which it is maintained by the said gyroscope.

In the figures, I have represented the hollow shaft 16, the upper end of which is connected to or forms a part of the gyroscope (not otherwise shown), and which is therefore maintained fixedly in space thereby. The said shaft 16 is preferably provided with two upright passages 17 and 18, the former being connected to some suitable supply of fluid pressure, such, for example, as a tank of compressed air (not shown). The passage 18 represents an exhaust passage for the fluid under pressure.

Figure 2:
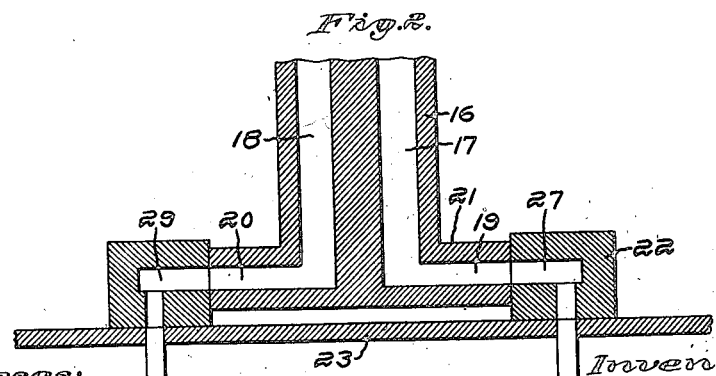
Fig. 2 is a transverse section upon the line 2—2 of Fig. 1.

The passages 17 and 18 are represented as provided respectively with outwardly directed, lower ends 19, 20 extending to the outer edge of the lower, enlarged, disk-like end 21 of said shaft 16. Loosely surrounding the said lower end of the shaft 16 is a ring 22, which is in frictional engagement with the hull 23 of the vessel as diagrammatically indicated in Fig. 2. The said ring 22 is provided throughout the desired or necessary portion of its periphery with ratchet teeth 24, 24, with which the toothed end 25, 26 of either core or plunger 12 or 13 may engage when energized through the oscillatory circuit in which it is positioned. Normally neither core or plunger is in engagement with the ratchet teeth of the ring 22, but when the said detector of the circuit 4 responds to wave emissions from the distant operator the core or plunger 12 engages the ratchet teeth of the ring and turns the same in a clockwise direction. Similarly when the detector of the circuit 5 responds to wave emissions from the distant operator, the ring is turned in a contraclockwise direction.

I provide suitable means of which I have disclosed one embodiment, whereby upon the movement of the ring 22 in either a clockwise or a contraclockwise direction, the rudder means or other suitable steering device is acted upon to deflect or deviate the vessel from that predetermined, definite or straight ahead direction of movement upon which it is normally maintained by the gyroscope. For this purpose, I have herein represented the ring 22 as having two passages 27, 28 for the admission of fluid pressure and either of which may be brought through the actuation of the suitable solenoid 12 or 13 into register with the extension 19 of the fluid pressure admission passage 17. The said ring is also provided with two exhaust passages 29 and 30, which are similarly adapted to be brought into register with the outwardly directed extension 20 of the exhaust passage 18.

In any suitable manner, the passages 27 and 28 are adapted to be brought into communication with a suitable cylinder 31 which is provided with a piston 32, the plunger 33 of which constitutes a portion of the rudder means and is connected in any suitable manner to the rudder of the vessel. Herein for the purpose I have represented the ring 22 as having circumferentially extending passages 34, 35 constituting continuations respectively of the passages 27, 28, and I provide suitable pipes or passages 36, 37, which are connected to the cylinder 31 upon opposite sides of the piston 32 thereof and which are maintained in communication with the fluid admission passages 27, 28 or the extensions 34, 35 thereof. In this manner the fluid under pressure entering through the passage 17 is admitted into whichever of the passages 27, 28 may be brought into register with the said passage 17, whereby the said fluid is admitted into the proper end of the cylinder 31 and the piston 32 thereof is thereby moved to turn the rudder and turn the vessel from its predetermined or straight ahead course. When the admission passage 27 is, by the energization of the solenoid 12, brought in register or communication with the passage 17 and its extension 19, the exhaust passage 29 of the ring 22 is brought into communication with the exhaust passage 18 and its extension 20 of the shaft 16; and I have herein represented the said exhaust passage 29 as connected by a pipe or passage 38 with the cylinder 31 at the side of the piston 32 opposite to which fluid pressure is admitted by the passage 27. Similarly when the fluid admission passage 28 of the ring 22 is brought into register or communication with the fluid admission passage 17 upon energization of the core or plunger 13, then the exhaust passage 30 of the ring 22 is brought in register with the exhaust passage 18 of the shaft 16, and I have herein represented said exhaust passage 30 as in communication by a pipe or passage 39 with the cylinder 31 at the end opposite that to which the pipe or passage 38 is connected.

Preferably the exhaust passages 29 and 30 are provided with circumferential extensions 40, 41 generally similar in construction and purpose to the extensions 34, 35.

So long as the cores or plungers 12 and 13 remain disconnected from the ring 22, the gyroscope acts through its shaft 16 to maintain the vessel upon its predetermined or straight-ahead course, inasmuch as if the hull of the vessel tends to turn to port or to starboard, it will, through frictional engagement therewith, cause the ring 22 to turn in one direction or the other, thus bringing the inlet passage 27 or the inlet passage 28 into register with the admission passage 17, so as thereby to turn the rudder sufficiently to overcome the tendency of the hull to deviate.

When, however, the distant operator wishes to deflect the vessel from its predetermined or straight-ahead course upon which it is maintained by the gyroscope, he will transmit wave lengths of frequencies or wave characteristics to which the circuit containing detector 6 or the detector 7 is responsive, as the case may be, so as through the described connections to turn the rudder to port or to starboard, thereby to turn the vessel in the described direction.

It will be understood that the distant operator may keep either passage 27 or 28 in communication with the admission passage 17 as long as desired, by continuing to send impulses to which the proper circuit is responsive, thereby continuing to energize the proper core or plunger 12 or 13. It will also be understood that the vessel or other body may be propelled in any suitable manner. I am not limited to the employment of different electrical characteristics, as I may employ any different radiant energy characteristics. I herein employ the terms "frequencies," "characteristics" and "values" in a broad sense.

Having thus described one illustrative embodiment of my invention, I desire it to be understood that although specific terms are employed, they are used in a generic and descriptive sense and not for purposes of limitation, the scope of the invention being set forth in the following claims.

Claims—

1. A system for controlling the operation of moving bodies at a distance by radiant energy, including in combination, a body to be propelled provided with means to maintain a predetermined or definite direction of bodily movement thereof, and means responsive to different wave lengths to modify by radiant energy from a distance the directional action of said direction-maintaining means.

2. A system for controlling the operation of moving bodies at a distance by radiant energy including in combination, a body to be propelled provided with means to maintain a predetermined or definite direction of bodily movement thereof, and means responsive only to different radiant energy characteristics to modify by radiant energy from a distance the directional action of said direction-maintaining means.

3. A system for controlling the operation of moving bodies at a distance by radiant energy including in combination, a body to be propelled, provided with a controller to maintain a predetermined or definite direction of bodily movement thereof, and means responsive to different wave lengths to change the course of said body.

4. A system for controlling the operation of moving bodies at a distance by radiant energy including in combination a vessel having a gyroscope to maintain a predetermined or definite direction of bodily movement thereof, and means responsive to different wave lengths to change the course of said vessel.

5. A system for controlling the operation of moving bodies at a distance by radiant energy including in combination a vessel having a gyroscope to maintain a predetermined or definite direction of bodily movement thereof, a plurality of circuits responding to different electrical frequencies, and means actuated thereby to change the course of said vessel.

6. A system of controlling the operation of moving bodies at a distance by radiant energy including in combination a vessel having a gyroscope to maintain a predetermined or definite direction of bodily movement thereof, a plurality of circuits responding to different electrical frequencies, and means actuated thereby to deflect the vessel to port or to starboard.

7. A system for controlling the operation of moving bodies at a distance by radiant energy including in combination a vessel having a gyroscope to maintain a predetermined or definite direction of bodily movement thereof, a plurality of circuits responding to different electrical frequencies, and fluid pressure means rendered operable thereby to change the course of the vessel.

8. A system for controlling the operation of moving bodies at a distance by radiant energy including in combination a vessel having a gyroscope to maintain a predetermined or definite direction of bodily movement thereof, fluid pressure controlled rudder means responsive to said gyroscope, and means responsive to different wave lengths and operable through said rudder means to change the course of the vessel.

9. A system for controlling the operation of moving bodies at a distance by radiant energy including in combination a vessel having a gyroscope to maintain a predetermined or definite direction of bodily movement thereof, rudder means, means responsive to different wave lengths transmitted by a distant operator, and fluid pressure means controlling said rudder means and rendered operable by said gyroscope and also by said responsive means.

10. A system for controlling the operation of moving bodies at a distance by radiant energy including in combination a vessel having a gyroscope to maintain a predetermined or definite direction of bodily movement thereof, rudder means, solenoids energized through different electrical characteristics or values and operative connections between said solenoids and said rudder means.

11. A system for controlling the operation of moving bodies at a distance by radiant energy including in combination a vessel having a gyroscope to maintain a predetermined or definite direction of bodily movement thereof, a plurality of solenoids energized through different electrical frequencies, a member movable by said solenoids, rudder means, and operative connections between said member and said rudder means.

12. A system for controlling the operation of moving bodies at a distance by radiant energy including in combination a vessel having a gyroscope to maintain a predetermined or definite direction of bodily movement thereof, a member rotatable in opposite directions, a pair of solenoids energized through different electrical frequencies, rudder means, and operative connections between said member and said rudder means.

13. A system for controlling the operation of moving bodies at a distance by radiant energy including in combination a vessel having a gyroscope to maintain a predetermined or definite direction of bodily movement thereof, a member rotatable in opposite directions, a pair of solenoids energized through different electrical frequencies, rudder means, and fluid pressure operative connections between said rotary member and said rudder means.

14. A system for controlling the operation of moving bodies at a distance by radiant energy including in combination a vessel having a gyroscope to maintain a predetermined or definite direction of bodily movement thereof, a member rotatable in opposite directions, means controlled thereby to change the course of the vessel to port or to starboard, from said first mentioned direction and circuits responding to different electrical characteristics or values to effect the rotation of said member.

15. A system for controlling the operation of moving bodies at a distance by radiant energy including in combination a vessel having a gyroscope to maintain a predetermined or definite direction of bodily movement thereof, rudder means, fluid pressure means operatively connected therewith, and means responsive to different wave lengths to control the operation of said fluid pressure means.

16. A system for controlling the operation of moving bodies at a distance by radiant energy including in combination a vessel having a gyroscope to maintain a predetermined or definite direction of bodily movement thereof, rudder means, fluid pressure connections between said gyroscope and said rudder means, and means responsive to different wave lengths, to modify by radiant energy from a distance, the action of said gyroscope upon said fluid pressure connections.

17. A system for controlling the operation of moving bodies at a distance by radiant energy including in combination a vessel having a gyroscope to maintain a predetermined or definite direction of bodily movement thereof, rudder means, pneumatic means operatively connected to said rudder means and through which the gyroscope may maintain the vessel in said predetermined or definite direction, and means responsive to different wave lengths and acting through said pneumatic means to change the course of the vessel to port or to starboard.

18. A system for controlling the operation of moving bodies at a distance by radiant energy including in combination a vessel having a gyroscope to maintain a predetermined or definite direction of bodily movement thereof, rudder means influenced by said gyroscope, a member movable in opposite directions and operatively connected to the rudder means to change the course of the vessel, and means responsive to different wave lengths to act upon said member.

19. A system for controlling the operation of moving bodies at a distance by radiant energy including in combination, a body to be propelled, provided with means to maintain a predetermined or definite direction of bodily movement thereof, means responding to certain wave frequencies to turn said body to the right, and means responding to other wave frequencies to turn said body to the left.

20. A system for controlling the operation of moving bodies at a distance by radiant energy including in combination, a body to be propelled provided with rudder means, controlling means to cooperate with the rudder means to maintain a predetermined or definite direction of bodily movement thereof, and means responsive to different wave characteristics to vary the control of the body by said controller through said rudder means and to steer the body.

21. A system for controlling the operation of moving bodies at a distance by radiant energy including in combination, a body to be propelled provided with rudder means, controlling means to cooperate with the rudder means to maintain a predetermined or definite direction of bodily movement thereof, and means responsive to different wave characteristics to modify the control of the body by said controller through said rudder means and to steer the body.

22. A system for controlling the operation of moving bodies at a distance by radiant energy including in combination a body to be propelled provided with rudder means, controlling means to cooperate with the rudder means to maintain a predetermined or definite direction of bodily movement thereof, and means responsive to different wave characteristics to effect the control of the body by said controller through the rudder means and to steer the body without reference to the direction which would otherwise be imposed upon said body by said controller.

23. A system for controlling the operation of moving bodies at a distance by radiant energy including in combination, a vessel having a gyroscope to maintain a predetermined or definite direction of bodily movement, and means responsive to different wave characteristics to change the course of said vessel.

24. A system for controlling the operation of moving bodies at a distance by radiant energy including in combination, a body to be propelled provided with means to maintain a predetermined or definite direction of bodily movement thereof, and means responsive to different electrical wave characteristics to modify by radiant energy from a distance the directional action of the direction-maintaining means.

25. A system for controlling the operation of moving bodies at a distance by radiant energy including in combination, a body to be propelled provided with a controller to maintain a predetermined or definite direction of bodily movement thereof, and means responsive to definite radiant energy wave characteristics to change the course of said body.

26. A system for controlling the operation of moving bodies at a distance by radiant energy including in combination, a vessel having a gyroscope to maintain a predetermined or definite direction of bodily movement thereof, and means responsive only to different radiant energy characteristics to change the course of said vessel.

27. A system for controlling the operation of moving bodies at a distance by radiant energy including in combination, a vessel having a gyroscope to maintain the predetermined or definite direction of bodily movement thereof, and means responsive to different wave characteristics to change the course of said vessel.

28. A system for controlling the operation of moving bodies at a distance by radiant energy including in combination, a vessel having a gyroscope to maintain a predetermined or definite direction of bodily movement thereof, fluid pressure controlled rudder means responsive to said gyroscope, and means responsive only to different characteristics of radiant energy and operable through said rudder means to change the course of the vessel.

29. The combination with a movable body, of means operative to stabilize said body with respect to a given axis, and means responsive to different radiant energy characteristics to modify the automatic action of said stabilizing means and to rotate said body selectively about said axis in either direction.

30. The combination with a movable body, of means automatically operative to stabilize said body with respect to a given axis, and means responsive only to different radiant energy characteristics to modify the automatic action of said stabilizing means and to rotate said body selectively about said axis in either direction.

31. The combination with a movable body, of means operative to stabilize said body with respect to a given axis, and means responsive to different radiant energy characteristics to modify the automatic action of said stabilizing means and to rotate said body selectively about said axis in either direction and to any extent desired in either case.

32. The combination with a movable body, of means automatically operative to stabilize said body with respect to a given axis, and means including two devices responsive to different radiant energy characteristics respectively to modify the action of said stabilizing means and to rotate said body about said axis.

33. The combination with a movable body, of means automatically operative to stabilize said body with respect to a given axis, and means including two devices responsive only to different radiant energy characteristics respectively to modify the action of said stabilizing means and to rotate said body about said axis.

34. The combination with a movable body, of means automatically operative to stabilize said body with respect to a given axis, and means including two devices responsive to different radiant energy characteristics respectively to modify the action of said stabilizing means and to rotate said body about said axis to any desired extent.

35. The combination with a movable body, of means automatically operative to stabilize said body with respect to a given axis, and means including two devices responsive to different radiant energy characteristics respectively to modify the action of said stabilizing means and to rotate said body about said axis in either direction.

36. The combination with a movable body, of means automatically operative to stabilize said body with respect to a given axis, and means including two devices responsive to different radiant energy characteristics respectively to modify the action of said stabilizing means and to rotate said body about said axis to any desired extent in either direction.

37. The combination with a movable body, of means automatically operative to stabilize said body with respect to a given axis, and means including a plurality of tuned oscillatory circuits respectively responsive to a plurality of radiant energy characteristics to modify the effect of said stabilizing means and to rotate said body about said axis.

38. The combination with a movable body, of means automatically operative to stabilize said body with respect to a given axis, and means including a plurality of tuned oscillatory circuits respectively responsive only to a plurality of radiant energy characteristics to modify the effect of said stabilizing means and to rotate said body about said axis.

39. The combination with a movable body, of means automatically operative to stabilize said body with respect to a given axis, and a plurality of devices responsive respectively to different characteristics of radiant energy, and operative to rotate said body in opposite directions respectively about said axis.

40. The combination with a movable body, of means automatically operative to stabilize said body with respect to a given axis, and a plurality of devices responsive respectively only to different characteristics of radiant energy, and operative to rotate said body in opposite directions respectively about said axis.

In testimony whereof, I have signed my name to this specification, in the presence of two subscribing witnesses.

JOHN HAYS HAMMOND, Jr.

Witnesses:
JOHN D. CUNNINGHAM,
L. BELLE TAU.